(12) United States Patent
Wang et al.

(10) Patent No.: US 8,533,664 B2
(45) Date of Patent: Sep. 10, 2013

(54) METHOD AND SYSTEM TO AUTOMATICALLY GENERATE GUI OBJECT ADDRESSING QUERIES

(75) Inventors: Cheng Wang, Beijing (CN); Kevin R. Walsh, Redwood City, CA (US); Pascal P. Sero, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1076 days.

(21) Appl. No.: 12/512,810

(22) Filed: Jul. 30, 2009

(65) Prior Publication Data
US 2010/0175050 A1    Jul. 8, 2010

Related U.S. Application Data

(60) Provisional application No. 61/143,067, filed on Jan. 7, 2009, provisional application No. 61/143,070, filed on Jan. 7, 2009.

(51) Int. Cl.
*G06F 9/44* (2006.01)

(52) U.S. Cl.
USPC .......................... 717/106; 717/109; 717/125

(58) Field of Classification Search
USPC .......................... 717/124–135, 106, 108, 109
See application file for complete search history.

(56) References Cited

U.S. PATENT DOCUMENTS 8,117,533 B2 *   2/2012   Adler et al. ................. 715/234
8,281,286 B2 * 10/2012   Nguyen ........................ 717/125

OTHER PUBLICATIONS

A. Theobald et al., "The Index-Based XXL Search Engine for Querying XML Data with Relevance Ranking," 2002, EDBT 2000, LNCS 2287, pp. 477-498.*

* cited by examiner

*Primary Examiner* — Anna Deng
(74) *Attorney, Agent, or Firm* — Shun Yao; Park, Vaughan, Fleming & Dowler LLP

(57) ABSTRACT

One embodiment of the present invention provides a system that automatically generates addressing queries for objects rendered on a graphical user interface (GUI). During operation, the system receives a request for GUI object-addressing query for an application to be tested. The system first identifies the application context, and retrieves a rule document describing GUI object-addressing query rules according to the identified application context. Next, the system parses the rule document to generate an applicable query rule set for the application. Based on the applicable query rule set, the system generates a set of query candidates and determines a unique query for each GUI object.

18 Claims, 12 Drawing Sheets

| RULE ENTRY 1002 | local-name()='button' |
|---|---|
| XSLT TEMPLATE 1004 | `<xsl:stylesheet version="1.0" xmlns:xsl="http://www.w3.org/1999/XSL/Transform">` |
| | `<xsl:param name="ATCK_ID"/>` |
| | `<xsl:output method="text" encoding="UTF-8"/>` |
| | `<xsl:template match="//button[@ATCK_ID=$ATCK_ID]">` — 1008 |
| | `<xsl:text>//button[@name='</xsl:text>` |
| | `<xsl:value-of select="@name"/>` |
| | `<xsl:text>']</xsl:text>` |
| | `</xsl:template>` |
| | `</xsl:stylesheet>` |
| GENERATED QUERY 1006 | //button[@label='Connect'] |

FIG. 10

METHOD AND SYSTEM TO AUTOMATICALLY GENERATE GUI OBJECT ADDRESSING QUERIES

RELATED APPLICATION

This application hereby claims priority under 35 U.S.C. §119 to U.S. Provisional Patent Application No. 61/143,067, filed on 7 Jan. 2009, entitled "METHOD AND MECHANISM TO IDENTIFY GUI OBJECTS FOR NON-MARKUP LANGUAGE PRESENTED APPLICATIONS," by inventors Cheng Wang, Kevin Walsh, and Pascal Sero, and to U.S. Provisional Patent Application No. 61/143,070, filed on 7 Jan. 2009, entitled "METHOD AND SYSTEM TO AUTOMATICALLY GENERATE GUI OBJECT ADDRESSING QUERIES," by inventor Cheng Wang, Kevin Walsh, and Pascal Sero.

This application is related to U.S. patent application Ser. No. 12/501,106, filed on 10 Jul. 2009 entitled "METHOD AND SYSTEM TO IDENTIFY GUI OBJECTS FOR NON-MARKUP-LANGUAGE-PRESENTED APPLICATIONS," by inventors Cheng Wang, Kevin Walsh, and Pascal Sero, which is incorporated by reference herein.

BACKGROUND

1. Field

The present disclosure relates to GUI object queries. More specifically, the present disclosure relates to automatically generating GUI object-addressing queries.

2. Related Art

As the demand for high-quality software increases, software testing plays an increasingly critical role in the software industry. In order to test the graphical user interface (GUI) of a software application, a tester usually has to manually repeat actions on the GUI. This process can be tedious and costly. Ever since the automated GUI testing tool was introduced, time and effort spent on software testing have been greatly reduced. However, one of the key barriers for large-scale deployment of automated GUI testing tools is how to identify GUI objects quickly and correctly.

In order for a computer to automatically test GUIs of software applications, a human tester's actions are usually recorded first and later replayed by the computer. The foundation of automatic GUI testing lies in identifying the GUI objects on which the tester performs actions at the recording time. The objects to be identified are recorded so that at the replay time, these objects can be identified and tester's actions are simulated.

Traditional testing tools usually define an embedded set of rules for generating addressing queries to identify GUI objects in an application under test. However, a single rule definition cannot deal with various applications. The embedded rule set is also hard to modify since it is hard-coded in the tools. Testers often have to manually construct queries specific to an application in order to identify different GUI objects in different application contexts.

SUMMARY

One embodiment of the present invention provides a system that automatically generates addressing queries for objects rendered on a graphical user interface (GUI). During operation, the system receives a request to generate an object-addressing query for a target GUI object in an application under tested. The system first identifies the application context, and retrieves a rule document describing GUI object-addressing query rules based at least on the identified application context. Next, the system parses the rule document to obtain an applicable query rule set for the application. Based on the applicable query rule set, the system generates a set of query candidates and determines a unique object-addressing query for the target GUI object.

In a variation of this embodiment, the rule document includes independent rules A respective rule includes at least one of an indication of an applicable application context, a rule name, a rule entry, and one or more rule templates.

In a further variation, a respective rule template is defined in the format of extensible stylesheet language transformations (XSLT). Generating a query candidate involves applying the XSLT-defined rule template and a markup language element corresponding to the target GUI object to an XSLT processor to generate an XML Path (XPath) language query In a variation of this embodiment, the system parses the rule document by first retrieving a rule-identification query defined in the rule entry of a respective rule. The system then executes the rule-identification query against the target GUI object in the context of a markup language document in which the object is represented as a node. Next, the system verifies whether the query result is true, and adds the rule to the applicable rule set when the query result is true.

In a variation of this embodiment, the system generates query candidates from the applicable rule set by first retrieving defined templates from each rule in the applicable rule set. The system then generates an object-addressing query for the target GUI object using a respective template. Next, the system executes the object-addressing query to identify a result GUI object in the application under test, and adds the object-addressing query to the set of query candidates if the result GUI object matches the target GUI object.

In a further variation, the system generates the object-addressing queries using templates.

In a variation of this embodiment, the system determines the unique object-addressing query for a GUI object by first ranking each query candidates using a predetermined ranking methods. The system then chooses the highest ranked query as the unique object-addressing query for the GUI object.

BRIEF DESCRIPTION OF THE FIGURES

FIG. 10 presents an exemplary rule entry with template and generated query in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

In order to automatically test GUI of software applications by a computer, a human tester's actions are usually recorded first and later played back by the computer. The major hurdle in testing a application is that the computer needs to identify which action the tester performs and, more importantly, on which GUI object the tester performs an action. Hence, a GUI object identification method for automatic identification of GUI objects in an application is introduced.

In traditional testing tools, the module that locates GUI objects operates during the recording process when the user's operations are recorded, and the addressing query rules are hard-coded in the testing tools, which users cannot easily adjust or change. Embodiments of the present invention provide a method for automatically generating GUI object-addressing queries for GUI objects on which the user operates. During the play-back phase, these GUI object-addressing queries can be applied to the GUI objects so that the software testing tool can accurate locate the same objects and repeat the same user operations. Unlike traditional techniques, the present invention allows users to specify application context and modify query rules. This novel context and rule-based query generation process ensures that the query generation is sufficiently generic so that it does not have to be hard-coded into each testing tool, and at the same time produces accurate, unique, and easy-to-read queries that can precisely identify the target GUI objects. As a result, embodiments of the present invention provide a more flexible and re-usable object-identifying technique.

In embodiments of the present invention, it is assumed that the GUI objects of an application under test are represented as nodes or elements in a markup language (e.g., XML) document. When a user operates on a target object, the system can apply a set of rules to generate an object-addressing query. For example, the query generation can be based on the target object's attributes, its hierarchy, or the attributes of its related objects (such as parent objects or sibling objects). Subsequently, during the play-back phase, the system can execute these queries to identify the same objects and repeat the user operations. The rule-based query generation can be used to test different applications without significant user modification.

Figure 1:
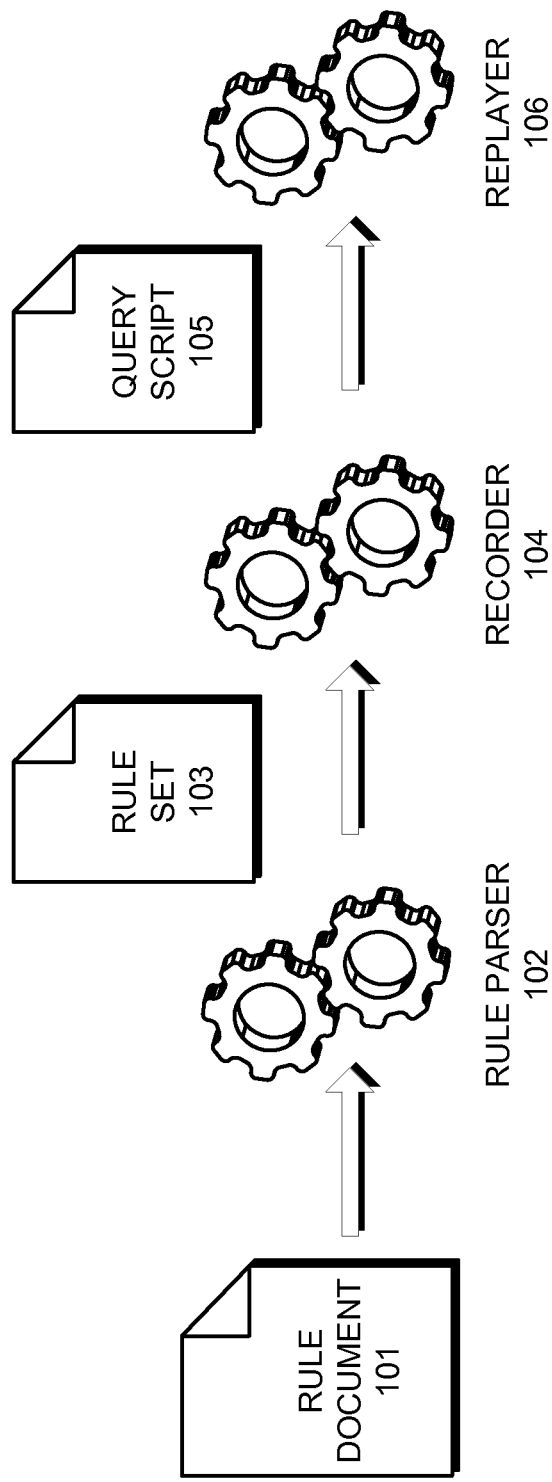
FIG. 1 illustrates an exemplary model of GUI functional testing tools in accordance with one embodiment of the present invention.

FIG. 1 illustrates an exemplary model of GUI functional testing tools in accordance with one embodiment of the present invention. A predefined rule document 101 describes rules for generating GUI object-addressing queries. If there is no such predefined rule document, an embedded or default rule set is used instead to generate queries. A rule parser 102 produces an applicable query rule set 103 based on rule document 101. Rule set 103 is passed to a recorder 104 which records user operations and generates the corresponding object-addressing queries. A query script 105 is recorded by recorder 104 for later playback by a replayer 106. If a user finds that certain rules do not match the user's application test, the user can change and redefine the query rules with the defined format. Then, rule parser 102 reloads the rule document and the changed rules can take effective immediately. The rule document used in embodiments of the present invention is much more flexible and efficient to maintain and migrate than an application-specific object repository.

Figure 2:
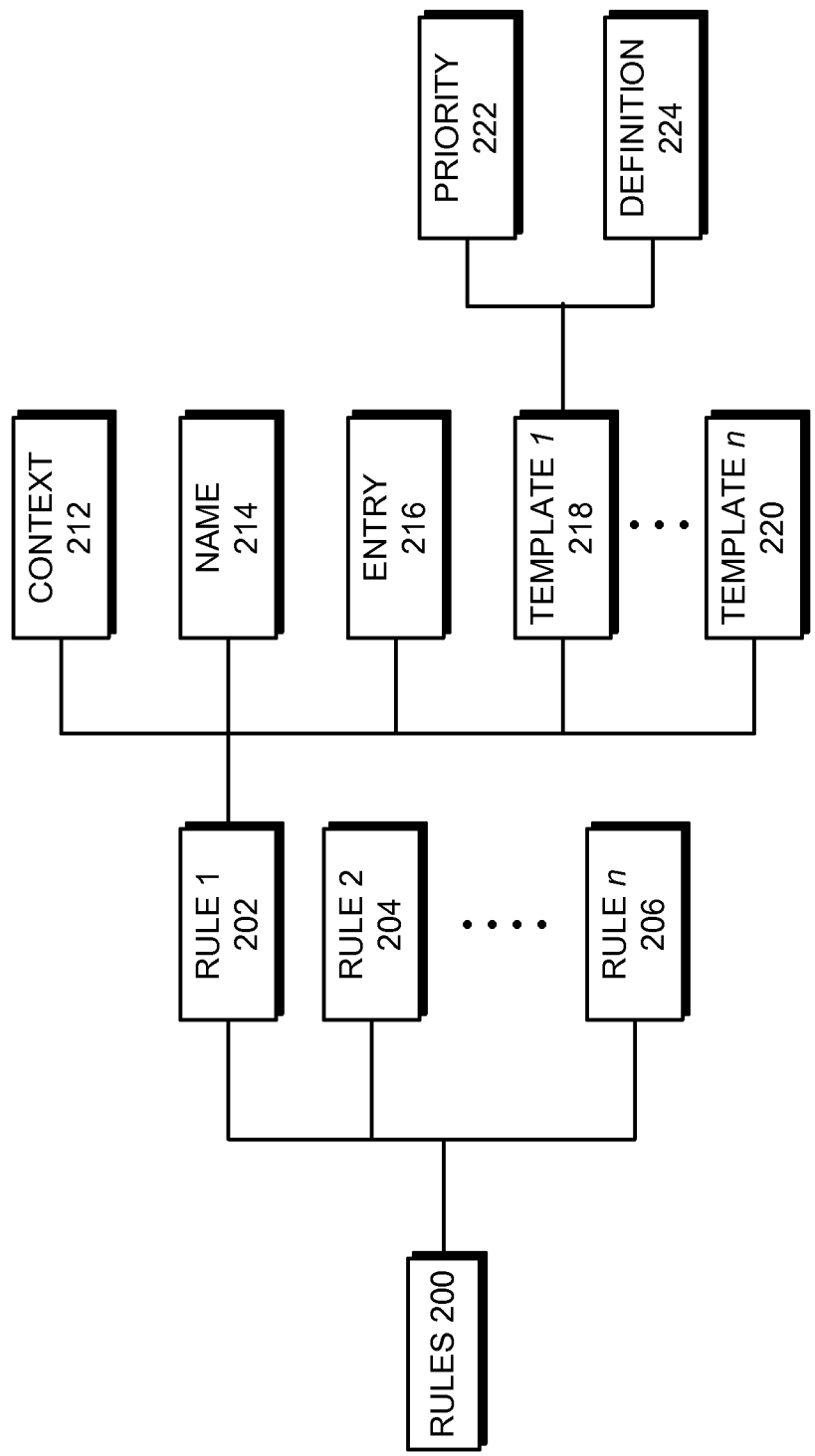
FIG. 2 presents a block diagram illustrating an exemplary rule set for generating GUI object-addressing queries in accordance with one embodiment of the present invention.

FIG. 2 illustrates an exemplary rule set structure for generating GUI object-addressing queries in accordance with one embodiment of the present invention. In an optional rule document, a rule set 200 includes independent rules 202, 204, and 206. Each rule includes an indication of application context 212, a rule name 214, a rule entry 216, and a number of templates 218 and 220. Template 218 includes a rule priority 222 and rule definition 224 for different testing applications. Application context 212 specifies the context to which the rule applies. An application context can include application type (such as native application, Web application, or database application), application name, application author, etc. Rule name 214 is a unique name which can be used to identify the corresponding rule. Rule entry 216 is a filter which determines whether the rule applies to a particular GUI object. In one embodiment, rule entry 216 specifies a rule-selection query. This query is applied to a target GUI object when the user operates on that object. As a result, rule entry 216 returns a true or false Boolean value. If the value is true, the corresponding rule is applicable to that target object. Otherwise, the corresponding rule is not considered by the system.

Rule template 218's priority 222 is used by the system to determine whether rule template 218 is selected when more than one template is applicable for a target object. Rule definition 224 for rule template 218 specifies how to generate a query given a target object. For example, rule definition 224 can specify that a query can be generated based on an object's name. In one embodiment, a rule definition in the format of extensible stylesheet language transformations (XSLT), so that existing XSLT processors can be used to process rule definitions and generate the object-addressing query as an XPath statement, wherein the object is represented as an XML node. In one embodiment, if more than one rule template is defined, the system can test all the templates to determine one or more templates which can successfully identify the target object. The system can then select the query generated by one of the successful templates.

Figure 3:
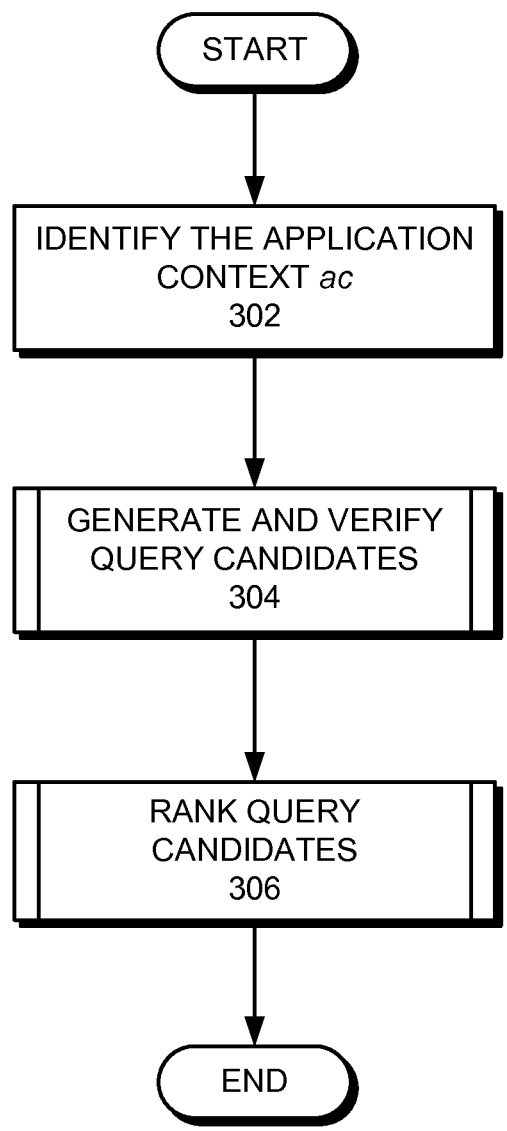
FIG. 3 presents a flow chart illustrating the process of generating and verifying query candidates in accordance with one embodiment of the present invention.

FIG. 3 presents a flow chart illustrating the high-level process of automatically generating GUI object-addressing queries in accordance with one embodiment of the present invention. During operation, the system first identifies the application context ac (operation 302). For a software application, a GUI-object context is always present, which is the environment in which all user actions are performed to the application, such as the main workspace of a word processor application. Next, the system generates and verifies addressing query candidates for a target GUI object in the application (operation 304), and then ranks the query candidates based on their priority so that a top-ranking candidate is chosen for each object (operation 306).

Figure 4:
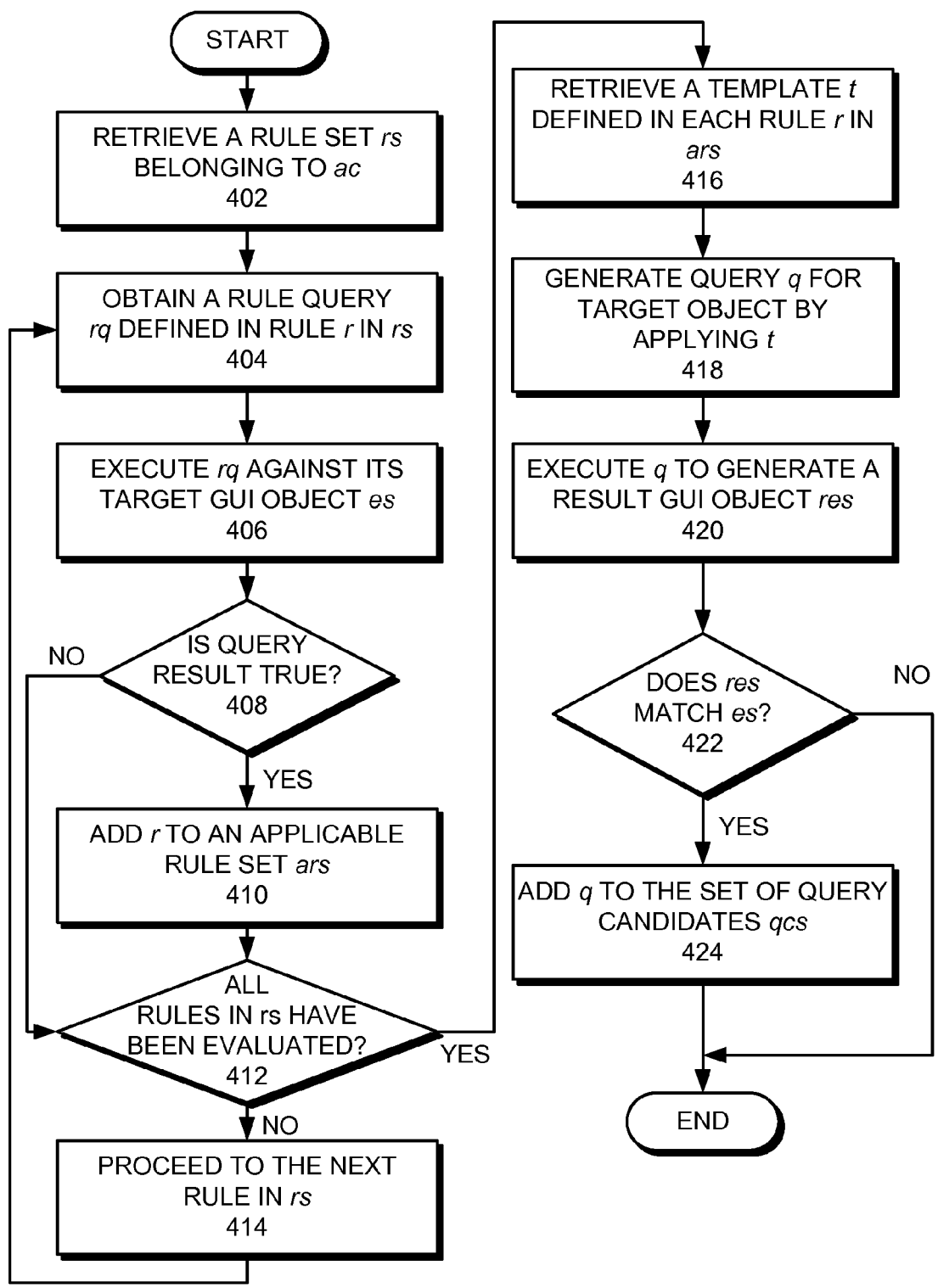
FIG. 4 presents a flow chart illustrating the process of ranking query candidates in accordance with one embodiment of the present invention.

FIG. 4 presents a flow chart illustrating the process of generating and verifying query candidates (operation 304) in more detail. During the process, the system retrieves a rule set rs matching the application context ac of the application under test (operation 402). The system then obtains a rule query rq defined in the rule entry (e.g. rule entry 216) in a rule r in rs (operation 404). Subsequently, rule query rq is executed against the target GUI object es in the context of the markup language document, wherein GUI object es is the object on which the user operates (operation 406). If the query result is determined to be true (operation 408), rq is appended to an applicable rule set ars (operation 410). Otherwise, the system proceeds to determine whether all the rules in rule set rs have been evaluated (operation 412). If not, the system proceeds to evaluate the next rule in rule set rs (operation 414). If all the rules have been evaluated and the applicable rule set ars is completed, the system retrieves a template t defined in each rule r in ars (operation 416), and generates an object-addressing query q for the target GUI object es by applying t (operation 418). Next, object-addressing query q is executed to locate a GUI object res (operation 420). If the located GUI object res matches the target GUI object es (operation 422), the query q is added to query candidate set qcs (operation 424). Otherwise, the process is terminated.

Note that the selection of a candidate object-address query can be based on different criteria. In one embodiment, the system only selects an object-addressing query when the query identifies one and only one GUI object which matches the target GUI object.

Figure 5:
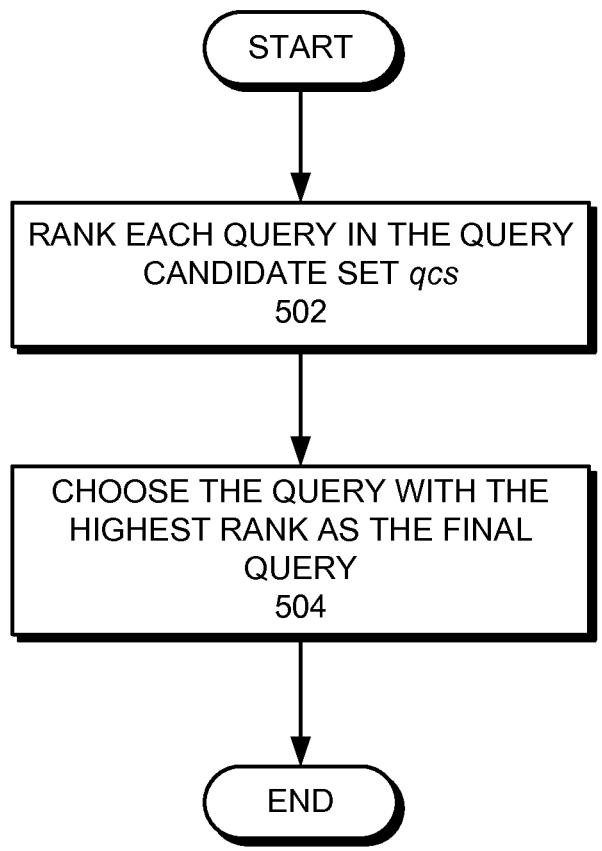
FIG. 5 presents a flow chart illustrating the process of ranking query candidates in accordance with one embodiment of the present invention.

The GUI-object identification process represents each target GUI object as a markup-language node in the markup-language document d. FIG. 5 presents a flow chart illustrating the process of ranking query candidates (operation 306) in more detail. During operation, the system can rank each query in the query candidate set qcs (operation 502). In one embodiment, this ranking can be performed based on each query's corresponding template priority. The query with the highest rank is then chosen as the selected query of the object (operation 504).

Figure 6:
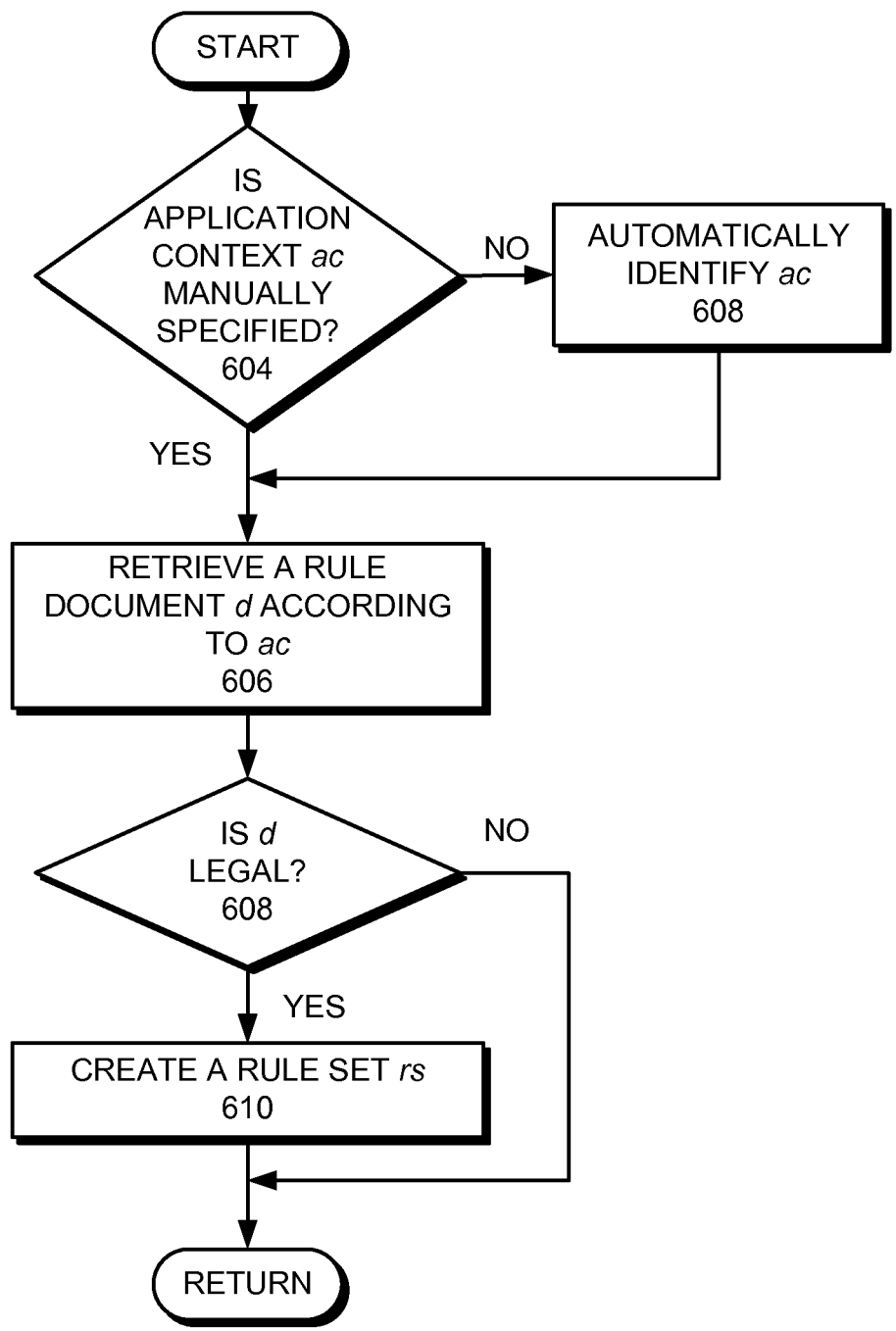
FIG. 6 presents a flow chart illustrating the process of creating a query rule set from a rule document in accordance with one embodiment of the present invention.

FIG. 6 presents a flow chart illustrating the process of creating a query rule set from a predefined rule document in accordance with one embodiment of the present invention. During operation, the system first determines whether the application context ac is manually specified by a user (operation 604). For example, a user can specify the current application type, such as web application or form application, so the system can choose a suitable rule document based on the type specified. If the user does not specify the application context, the system can automatically identify an application context once the application is started (operation 608). After application context ac is identified, the system retrieves a rule document d according to ac (operation 606). Next, the system loads d and determines whether its format is legal (operation 608). If so, a query rule set rs for the application is successfully created for further operation (operation 610).

Figure 7:
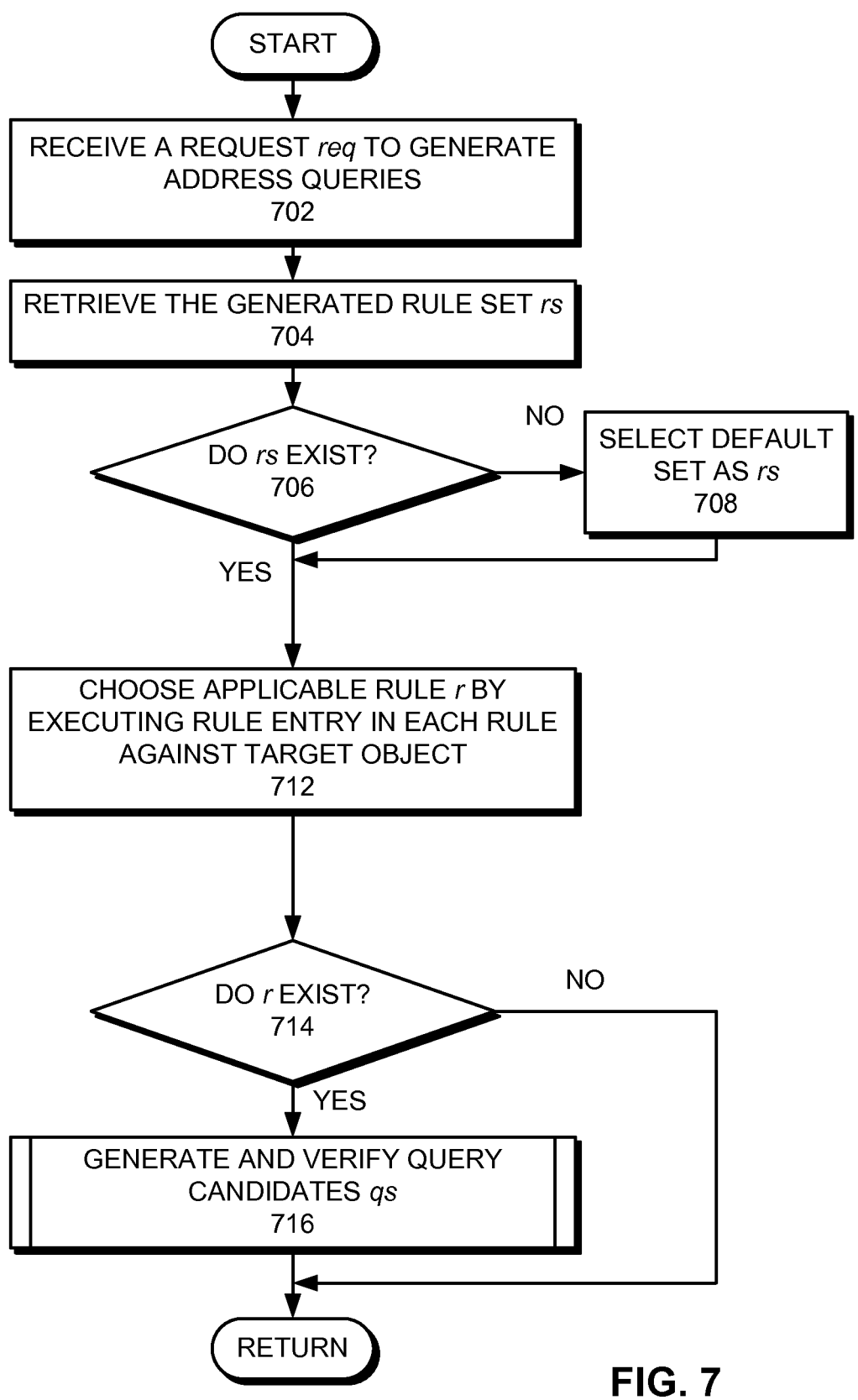
FIG. 7 presents a flow chart illustrating the process of generating an applicable query rule set for the target GUI object from the query rule set in accordance with one embodiment of the present invention.

In order to generate GUI object queries for an application to be tested, the system needs to choose applicable query rules from the query rule set. FIG. 7 presents a flow chart illustrating the process of generating an applicable query rule set in accordance with one embodiment of the present invention. When the generation procedure begins, the system receives a request req to generate an addressing query for a target GUI object (operation 702). The system then attempts to retrieve a query rule set rs (operation 704) created in the process illustrated in FIG. 6. Next, the system determines whether rs exists (operation 706). If not, the system will select a default rule set as rs (operation 708) so the process can continue. The system then choose the applicable rule r by executing the rule entry of r executed against the object node in the context of the markup language document, and r is chosen if the result of the execution is true. For example, in testing a web application, a rule entry is defined in the format of XML Path language (XPath), and the system compares the XPath entry against the requested web object. If matched, the rule is applicable. The system then determines whether an applicable rule exists (operation 714) before generating the query candidates qs (operation 716).

Figure 8:
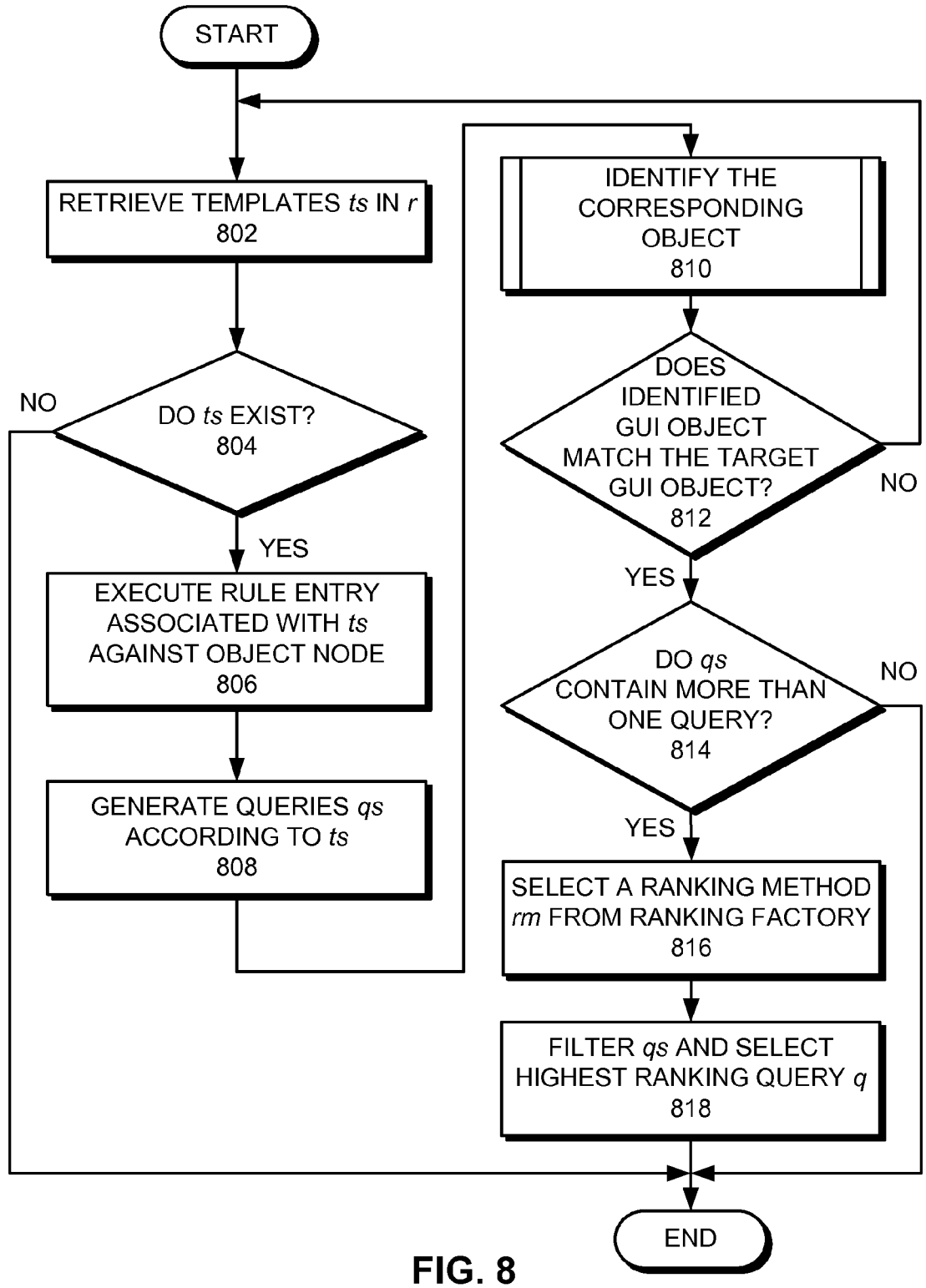
FIG. 8 presents a flow chart illustrating the process of generating query candidates from the applicable rule set in accordance with one embodiment of the present invention.

After all the applicable query rules are added to the applicable rule set, GUI object-addressing query candidates can be generated. FIG. 8 presents a flow chart illustrating the detailed process of generating query candidates from the applicable rule set. The system first tries to retrieve a template ts defined in an applicable rule r (operation 802). The system then determines if ts exists (operation 804). If no template is defined in r, the process for the current rule is terminated. Otherwise, the system executes the rule entry associated with ts against the target object node in the context of the markup language document (operation 806) and generates queries qs according to ts (operation 808). Once the system generates all queries that conform to queries qs, the query identification process begins. The system first identifies the corresponding object for each query generated (operation 810), which is illustrated in detail in FIG. 9. Next, the identified GUI object is compared against the target GUI object to determine whether they match (operation 812). If not, the system retrieves a template ts with the next highest priority in r and restarts the process (operation 802). Otherwise, the system further determines whether query qs contains more than one query (operation 814). If so, the system selects a ranking method rm (operation 816) from a ranking factory, and filters qs and chooses the highest ranking query q (operation 818). Otherwise, the process terminates.

Figure 9:
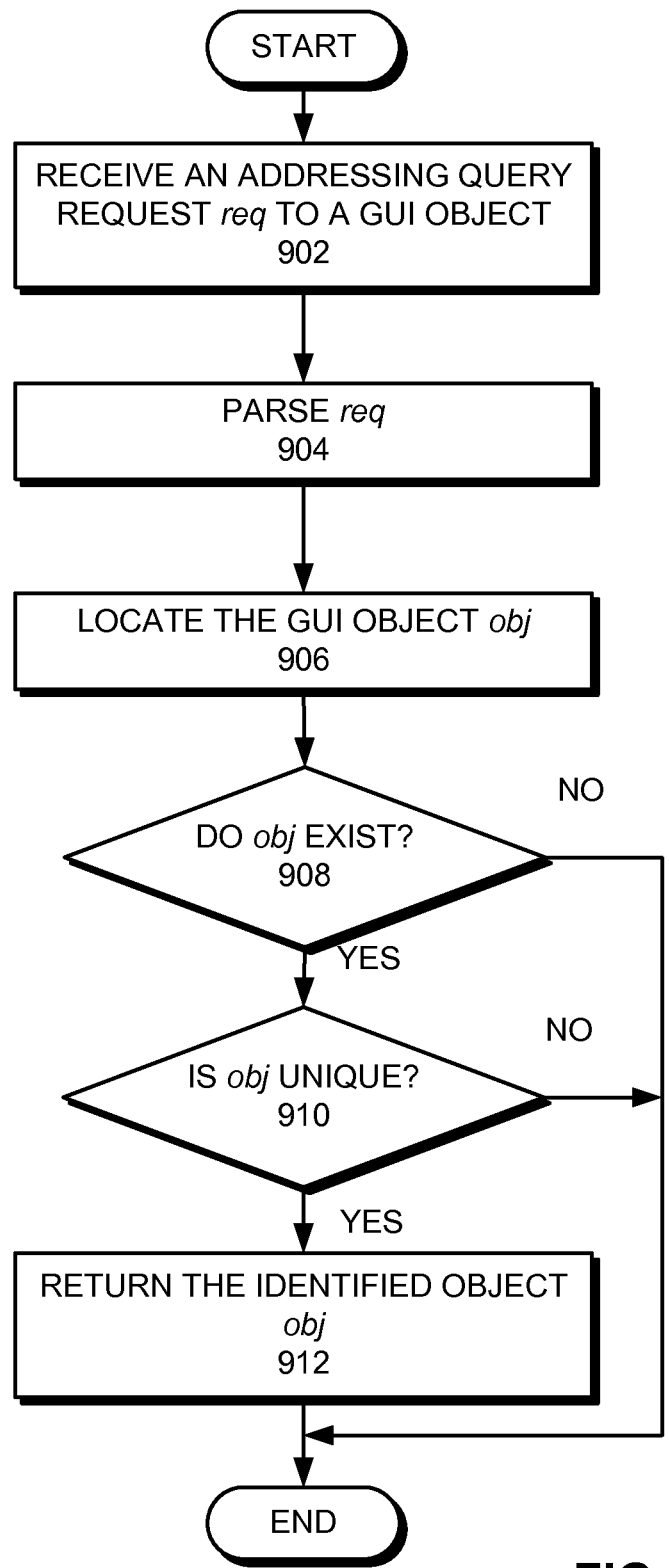
FIG. 9 presents a flow chart illustrating the process of identifying a GUI object using an addressing query in accordance with one embodiment of the present invention.

FIG. 9 presents a flow chart illustrating the process of identifying a GUI object using an addressing query in accordance with one embodiment of the present invention. The system starts by receiving an addressing query request req to locate a GUI object (operation 902). The system then parses the addressing query (operation 904), and locates GUI object obj (operation 906). Next, the system determines whether obj exists (operation 908); if so, the system further determines whether obj is unique (operation 910). Otherwise, the process is terminated. If obj is unique, the system returns the found object (operation 912); otherwise system returns a null value, and the process is terminated.

FIG. 10 presents an exemplary rule 1000 with template and generated query in accordance with one embodiment of the present invention. Rule 1000 contains three fields: a rule entry 1002, an XSLT template 1004, and a generated query 1006. XSLT template 1004 further includes a parameter name of "ATCK_ID", an output method of "text" with "UTF-8" encoding, and a template body 1008. Query 1006 is generated to simply match a GUI object with a label of 'connect'.

Figure 11:
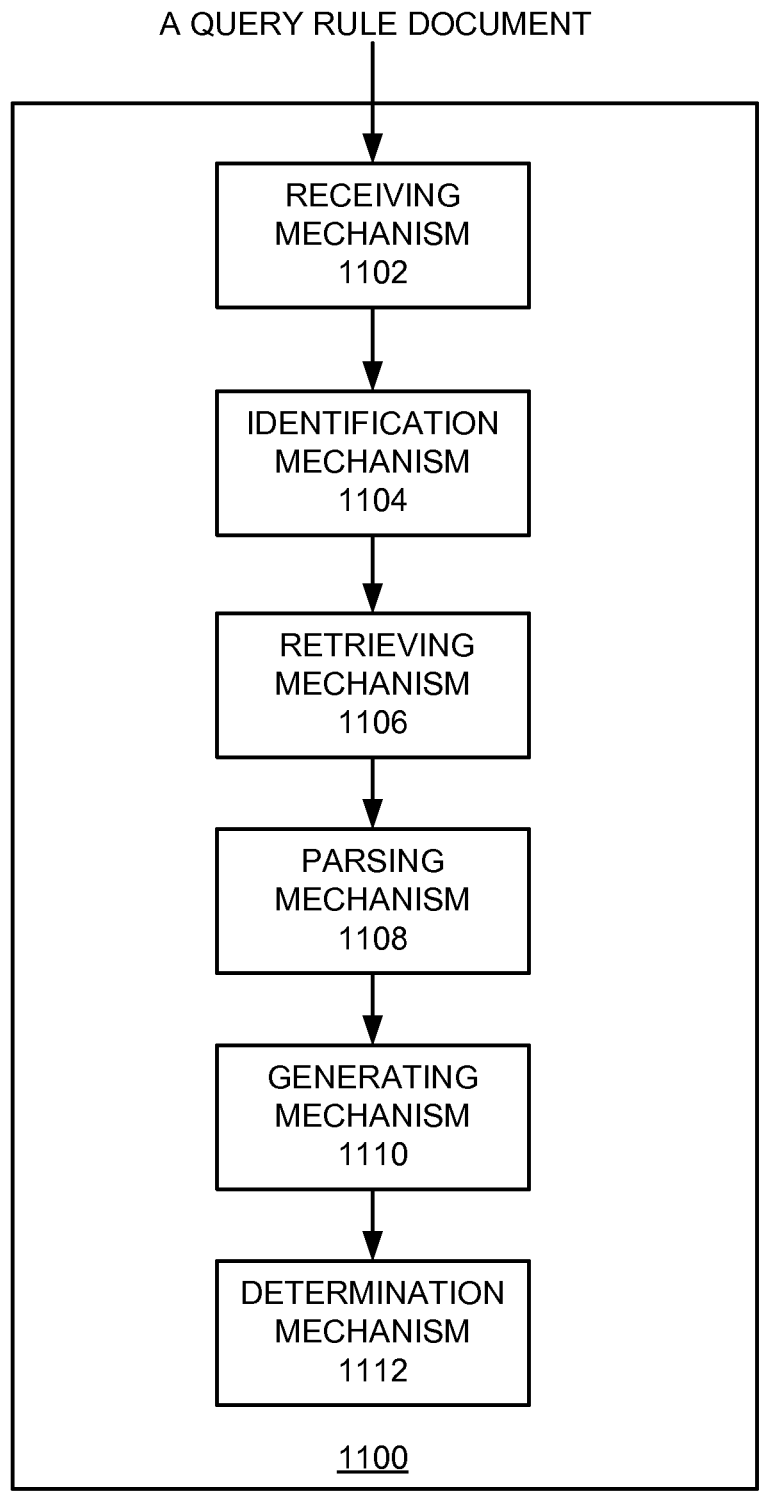
FIG. 11 presents a block diagram illustrating a system for automatically generating GUI object-addressing queries in accordance with one embodiment of the present invention.

FIG. 11 presents a block diagram illustrating a system for automatically generating GUI object-addressing queries in accordance with one embodiment of the present invention. As shown in FIG. 11, object query generating system 1100 includes a receiving mechanism 1102, an identification mechanism 1104, a retrieving mechanism 1106, a parsing mechanism 1108, a generating mechanism 1110, and a determination mechanism 1112. During operation, receiving mechanism 1102 receives a request for GUI object-addressing queries for an application to be tested. Identification mechanism 1104 identifies the application context. Retrieving mechanism 1106 then retrieves a rule document describing GUI object-addressing query rules according to the identified application context. The rule document is parsed by parsing mechanism 1108 to generate an applicable query rule set for the application. Subsequently, generating mechanism 1110 generates a set of query candidates from the applicable rule set, and determination mechanism 1112 determines a unique query for each GUI object.

Figure 12:
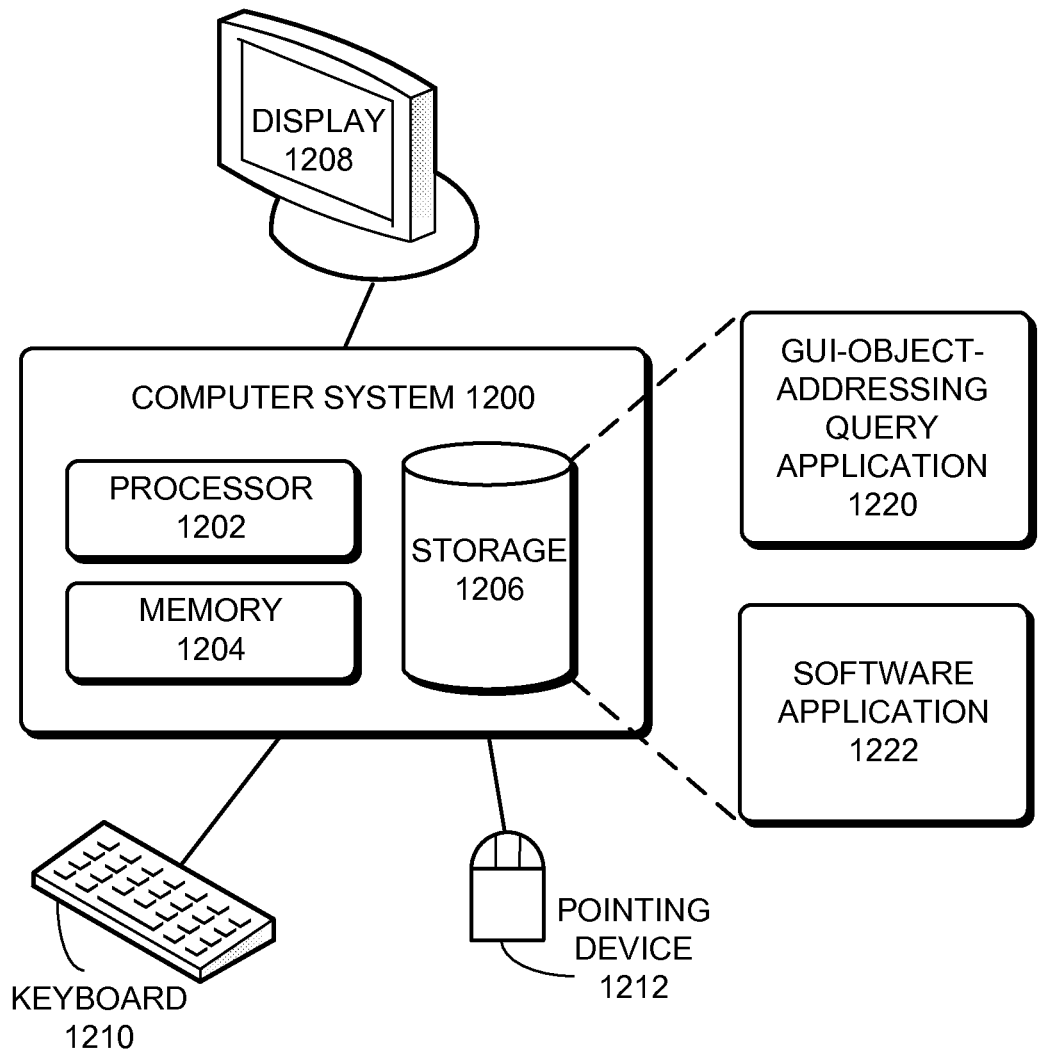
FIG. 12 illustrates an exemplary computer system for automatically generating GUI object-addressing queries in accordance with one embodiment of the present invention.

FIG. 12 illustrates an exemplary computer system for automatically generating addressing queries for GUI objects. In one embodiment, a computer system 1200 includes a processor 1202, a memory 1204, and a storage device 1206, and is coupled to an optional display 1208, keyboard 1210, and pointing device 1212. Storage device 1206 stores a GUI-object-addressing query application 1220, as well as other applications, such as a software application 1222 to be tested. During operation, GUI-object-addressing query application 1220 is loaded from storage device 1206 into memory 1204 and then executed by processor 1202. While executing the program, processor 1202 performs the aforementioned methods.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, ASICs, FPGAs, and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for automatically generating addressing queries for objects rendered on a graphical user interface (GUI), wherein the method comprises:
   receiving a request to generate an object-addressing query for a target GUI object in an application under test;
   identifying an application context for the application under test;
   retrieving a rule document describing GUI object-addressing query rules based at least on the identified application context;
   parsing the rule document to obtain an applicable query rule set for the application, wherein parsing the rule document comprises:
      retrieving a rule-identification query defined in the rule entry of a respective rule,
      executing the rule-identification query against the target GUI object in the context of a markup language document in which the object is represented as a node,
      verifying whether the query result is true, and
      adding the rule to the applicable rule set when the query result is true;
   generating a set of query candidates for the target GUI object based at least on the applicable rule set; and
   determining a unique object-addressing query for the target GUI object.

2. The method of claim 1, wherein the rule document comprises independent rules, and wherein a respective rule comprises at least one of:
   an indication of an applicable application context;
   a rule name;
   a rule entry; and
   one or more rule templates.

3. The method of claim 2, wherein a respective rule template is defined in the format of extensible stylesheet language transformations (XSLT), and wherein generating a query candidate comprises applying the XSLT-defined rule template and a markup language element corresponding to the target GUI object to an XSLT processor to generate an XML Path (XPath) language query.

4. The method of claim 1, wherein generating query candidates based on the applicable rule set comprises:
   retrieving defined templates from each rule in the applicable rule set;
   generating an object-addressing query for the target GUI object using a respective template;
   executing the object-addressing query to identify a result GUI object in the application under test; and
   adding the object-addressing query to the set of query candidates if the result GUI object matches the target GUI object.

5. The method of claim 4, wherein within a respective rule the object-addressing queries are generated using the templates.

6. The method of claim 1, wherein determining the unique object-addressing query for a GUI object comprises:
   ranking each query candidate using a predetermined ranking method; and
   choosing the highest ranked query as the unique object-addressing query for the GUI object.

7. A non-transitory computer-readable storage medium storing instructions which when executed by a particular machine cause the machine to perform a method for automatically generating addressing queries for objects rendered on a GUI, the method comprising:
   receiving a request to generate an object-addressing query for a target GUI object in an application under test;
   identifying an application context for the application under test;
   retrieving a rule document describing GUI object-addressing query rules based at least on the identified application context;
   parsing the rule document to obtain an applicable query rule set for the application, wherein parsing the rule document comprises:

retrieving a rule-identification query defined in the rule entry of a respective rule, executing the rule-identification query against the target GUI object in the context of a markup language document in which the object is represented as a node, verifying whether the query result is true, and adding the rule to the applicable rule set when the query result is true;

generating a set of query candidates for the target GUI object based at least on the applicable rule set; and determining a unique object-addressing query for the target GUI object.

8. The non-transitory computer-readable storage medium of claim 7, wherein the rule document comprises independent rules, and wherein a respective rule comprises at least one of:

an indication of an applicable application context;

a rule name;

a rule entry; and one or more rule templates.

9. The non-transitory computer-readable storage medium of claim 8, wherein a respective rule template is defined in the format of extensible stylesheet language transformations (XSLT), and wherein generating a query candidate comprises applying the XSLT-defined rule template and a markup language element corresponding to the target GUI object to an XSLT processor to generate an XML Path (XPath) language query.

10. The non-transitory computer-readable storage medium of claim 7, wherein generating query candidates based on the applicable rule set comprises: retrieving defined templates from each rule in the applicable rule set; generating an object-addressing query for the target GUI object using a respective template; executing the object-addressing query to identify a result GUI object in the application under test; and adding the object-addressing query to the set of query candidates if the result GUI object matches the target GUI object.

11. The non-transitory computer-readable storage medium of claim 10, wherein within a respective rule the object-addressing queries are generated using templates.

12. The non-transitory computer-readable storage medium of claim 7, wherein determining the unique object-addressing query for a GUI object comprises: ranking each query candidate using a predetermined ranking method; and choosing the highest ranked query as the unique object-addressing query for the GUI object.

13. A computer system for automatically generating addressing queries for GUI objects, the system comprising:

a processor;

a memory;

a receiving mechanism configured to receive a request to generate an object-addressing query for an application to under test;

an identification mechanism configured to identify an application context for the application under test;

a retrieving mechanism configured to retrieve a rule document describing GUI object-addressing query rules based at least on the identified application context;

a parsing mechanism configured to parse the rule document to obtain an applicable query rule set for the application, wherein the parsing mechanism further comprises:

a retrieving mechanism configured to retrieve a rule-identification query defined in the rule entry of a respective rule, an execution mechanism configured to execute the rule-identification query against the target GUI object in the context of a markup language document in which the object is represented as a node, a verification mechanism configured to verify whether the query result is true, and an organizing mechanism configured to add the rule to the applicable rule set if the query result is true;

a generating mechanism configured to generate a set of query candidates for the target GUI object based at least on the applicable rule set; and a determination mechanism configured to determine a unique object-addressing query for the target GUI object.

14. The computer system of claim 13, wherein the rule document comprises independent rules, and wherein a respective rule comprises of at least one of:

an indication of an applicable application context;

a rule name;

a rule entry; and one or more rule templates.

15. The computer system of claim 14, wherein a respective rule template is defined in the format of extensible stylesheet language transformations (XSLT), and wherein generating a query candidate comprises applying the XSLT-defined rule template and a markup language element corresponding to the target GUI object to an XSLT processor to generate an XML Path (XPath) language query.

16. The computer system of claim 13, wherein the generating mechanism further comprises:

a retrieving mechanism configured to retrieve defined templates based on each rule in the applicable rule set;

a converting mechanism configured to generate an object-addressing query for the target GUI object using a respective template;

an execution mechanism configured to execute the object-addressing query to identify a result GUI object in the application under test; and an organizing mechanism configured to add the object-addressing query to the set of query candidates if the result GUI object matches the target GUI object.

17. The computer system of claim 16, wherein within a respective rule the object-addressing queries are generated using templates.

18. The computer system of claim 13, wherein the determination mechanism further comprises:

a ranking mechanism configured to rank each query candidate using a predetermined ranking method; and a choice making mechanism configured to choose the highest ranked query as the unique object-addressing query for the GUI object.

* * * * *